Patented Feb. 8, 1949

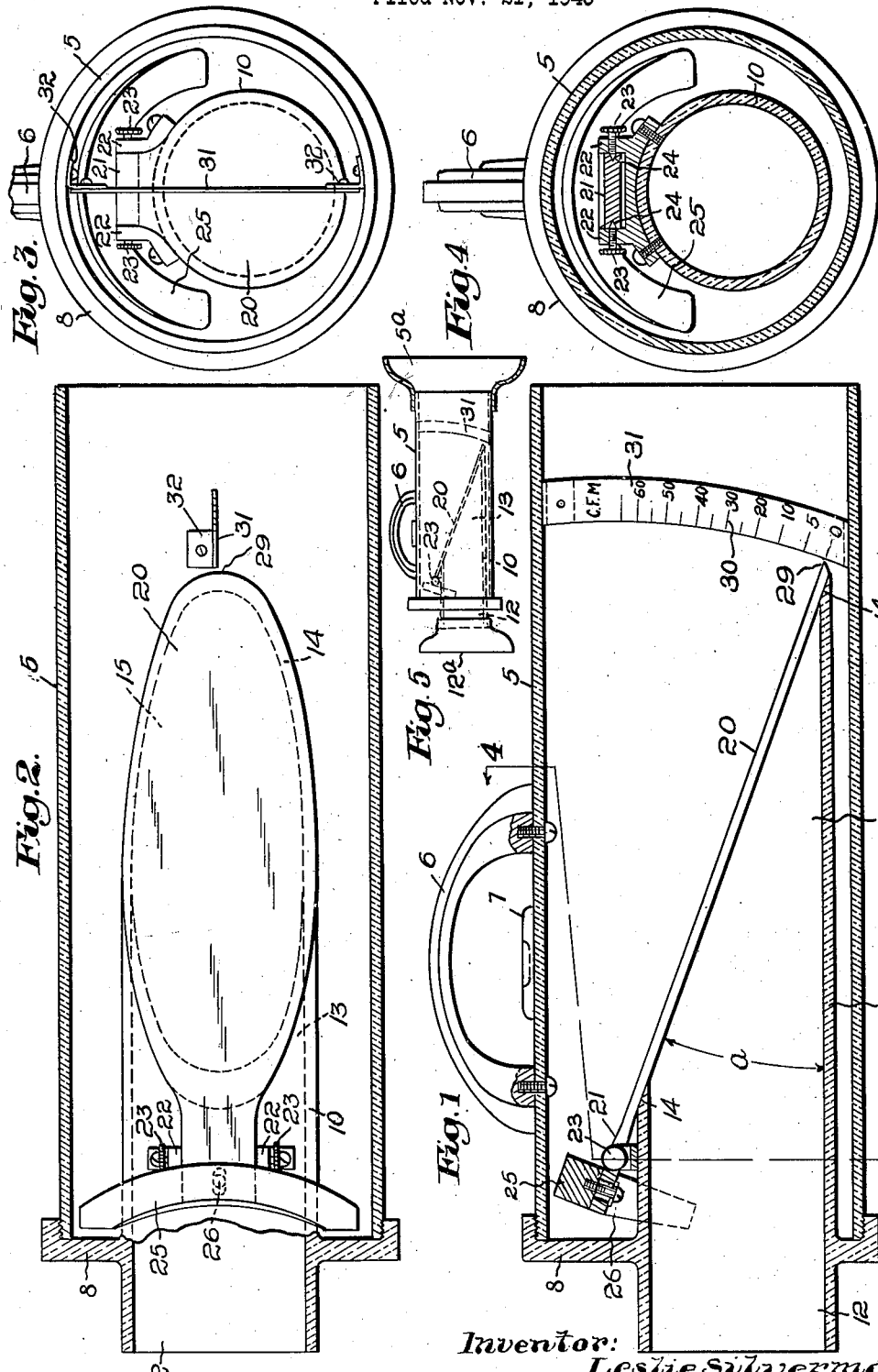

2,461,351

UNITED STATES PATENT OFFICE 2,461,351

FLOWMETER

Leslie Silverman, Westwood, Mass.

Application November 21, 1945, Serial No. 630,027

6 Claims. (Cl. 73—228)

My present invention relates to detecting and measuring the flow of fluids, particularly air and other gases. It aims to provide for such purposes in manually portable apparatus and devices of sturdy, relatively inexpensive and otherwise improved construction, with capacity for accurate and sensitive performance under a wide variety of flow conditions.

In the drawings illustrating by way of example a characteristic embodiment of the invention:

Fig. 1 is a central vertical section through the device as a whole;

Fig. 2 is a corresponding horizontal section;

Fig. 3 is an end elevation looking from the right in Figs. 1 and 2;

Fig. 4 is a cross-section substantially on the line 4—4 of Fig. 1; and

Fig. 5 is an elevation on a smaller scale showing certain alternative end formations for the device.

The portable meter unit as a whole includes means defining a path of flow, an associated indicator element, and means for operatively supporting them. In the illustrative embodiment of the drawings, the support comprises an elongated case or housing 5, shown as a cylindrical shell proportioned to enclose the operating parts. The housing has a carrying handle 6 on its outer wall, at the top in the horizontal use position of the device. To facilitate accurate horizontal alignment the housing may be equipped with a bubble or other type of leveling gauge 7, for convenience and protection set below the arch of the handle.

For easy reading of the contained indicator at least a substantial area of the housing is windowed or transparent. Herein for simplicity and manufacturing facility the entire main element of the housing 5 is integrally formed of a transparent material, of appropriate strength and rigidity, such for example as "Plexiglas," "Lucite," and others. One end of the housing 5 is threaded to receive a like-threaded end cap and closure member 8 on which the operating parts are herein disposed as a demountable unit.

Such metering unit comprises a flow tube 10, presenting a passage of a length to define a path for the air and other fluent to be examined. This flow tube is preferably cylindrical and of uniform inside diameter, with a smooth unobstructed inner wall. To permit observation of the flow path, the tube may be of a transparent material such as that of the housing, in which case the tube offers the further advantages of light weight and low-cost manufacture. The flow tube is fitted through and secured as by cementing in an opening for the purpose in the housing cap 8, herein eccentrically of the latter. The tube and housing have parallel axes and are radially spaced from each other to accommodate the movable indicator means. At the capped end of the housing the flow tube 10 projects outward, its open end providing a fluid inlet 12. From the inlet the tube extends into and terminates within the housing 5, the open end of the latter providing for escape of the fluid.

As an important feature of the invention the housed portion of the flow tube 10 terminates in an elongated planar bevelled formation 13 defined by a gradually inclined or acutely oblique plane having a relatively small enclosed or bevel angle with respect to the tube axis and top and bottom wall portions. This angle is indicated by the arrows and the letter $a$ on Fig. 1. The gently sloping end wall or rim 14 of the tube and the outlet 15 defined thereby have the form of an elongated ellipse, the major axis of which is in the vertical plane containing the tube axis. Thus the outlet 15 is of maximum extent in the direction of and approaches parallelism to the flow.

The inclined end wall or rim 14 serves as a seat for a pivoted flap or vane 20 comprising a plate of rigid, light-weight material, preferably transparent, and which may be of similar composition as the flow tube 10 and herein also the housing 5. In the total absence of flow in the tube the vane 20 seats by gravity upon the seat 14 and in closing relation to the outlet 15.

By reason of the acute obliquity of the outlet the vane 20 is disposed at a correspondingly flat angle in the flow path. Consequently a minimum of restriction to the flow is offered by the vane, while conversely the vane has a maximum sensitivity and capacity for metering movement in response to low values of flow. It has been determined that the angle of obliquity referred to has a critical value with respect to freely flowing fluids admitted at the tube inlet 12. Satisfactory performance for the device of the invention may be had with obliquity values in the range from about 15° to about 30°, with maximum efficiency for air and other gases at an outlet angle of 20° or within a degree or so above or below such value.

The vane 20 is arranged for vertical movement about a horizontal pivot adjacent the upper margin of the oblique outlet 15. In the illustrated example the vane has pivotal support on the flow tube 10 itself, and the tube, the vane and the housing cap 8 form a unit separable as such from the housing. Accordingly the upper segment of the vane 20, toward the tube inlet, has an integral or other longitudinal extension 21 received between laterally spaced posts 22 on the tube 10. The vane extension 21 and the tube posts 22 have horizontal pivotal connection of a friction-reducing form such as the pointed bearing screws 23 adjustably extended through the respective posts and received in corresponding bearing recesses 24 in lateral alignment on the vane extension 21.

For maximum sensitivity the vane 20 is proportioned and balanced so that under normal or zero-flow conditions it rests lightly in closing relation on the inclined seat 14 at the flow outlet 15. Beyond the horizontal pivot means 23—24 the vane extension 21 carries an arcuate yoke-like counterweight 25 symmetrically straddling the flow tube. It is shown as generally conformant to the inner wall of the housing and is shaped and proportioned to stand out of contact with both the tube and the housing, in all positions of the vane 20 within the intended metering range. The counterweight 25 may be detachably secured to the vane extension, desirably with capacity for balancing adjustment, as by a fastening screw 26 passing through a slot in the vane and tapped into the weight member. Thus the longitudinally extensive vane together with the means for pivoting and counterbalancing it are unitarily assembled with the tube 10 and the housing cap 8, and all vane parts are accommodated with working clearance in the annular space between the flow tube and the housing. It is noted that the main mass of the counterweight lies above the path of flow and largely above the vane pivot location, with avoidance of any depending portion below the vane. Further, the counterweight 25 as shown is formed to present a large exposed surface area which in conjunction with the rear surface of the vane extending beyond the pivot 23 acts as an air damper to restrain pulsation and extraneous movement of the vane.

The transparent housing 5 further serves as a mount for the scale or index 30 along which the flow readings are had. In the illustrated example, noting particularly Fig. 2, the flow indicia 30 are presented on a strip or plate 31 diametrally disposed in the housing adjacent the free extremity of the vane, substantially in the vertical plane of the longitudinal axes of the housing and of the flow tube. Such index plate may be variously secured to the housing, preferably replaceably, as by angle brackets 32 on the housing wall. The edge portion of the scale adjacent the vane is disposed along an arc concentric with the vane pivot, and the scale graduations 30 desirably are arranged as radii thereof, in prolongation of the plane of the vane position opposite any given graduation.

Desirably the outer terminal portion of the vane itself is constituted as the indicator element or pointer, as at 29, Figs. 1 and 2, the parts being proportioned and arranged for close tracking of the pointer along the scale. Thus overlapping of any vane-carried part onto the scale is avoided. This permits the housing 5 to be removed by merely unscrewing and backing off the end cap 8 together with the flow tube and vane elements, in any position of the device as a whole, the scale strip offering no obstruction to relative rotation as between the housing and the tube and vane assembly.

In the particular example, the scale is shown as graduated in C. F. M. units, that is, cubic feet per minute, the calibration with reference to the flow and the corresponding vane positions being volumetric. If desired the calibration may be in terms of flow velocity (e. g. feet per minute), the appropriate velocity scale being provided either supplementally or alternatively to the volumetric scale 30.

The flow meter of the invention as illustrated dispenses with springs, the vane being gravity-returned in the closing direction. It will be understood that calibration of the scale 30 is made with reference to a horizontal position of the flow tube. Such positioning is readily had in the use of the meter, through observation of the conveniently located leveling gauge 7 and by bodily manipulating or adjusting the device accordingly. Further, the device throughout being constructed and arranged to avoid requirement of complex and delicate mechanism, is adapted to retain precision and efficiency over a long period of use without extraordinary care in handling and transporting. At the same time requisite sensitivity and accuracy are had over an extensive range, largely by the provision of the flat elongated bevel formation for the flow outlet and the corresponding acutely oblique inclination for the vane and the prolonged extent thereof in the flow path, with the resulting leverage advantage afforded the markedly elongate vane-indicator element. In the instance of a flow tube of circular cross-section, as illustrated, the outlet end has the form of an acutely oblique cylinder and the outlet opening 15 and the vane seat 14 are elongated ellipses in the plane of the oblique base. As explained, the angle value is an important feature of the invention, sensitivity of vane response being inversely proportionate or approximately so to the angle of obliquity, down to a critical angle in the vicinity of 20°.

The flow tube inlet 12 as shown is adapted for connection with a flexible or other conduit to extend to the particular location at which the flow is to be tested, as for example, a ventilator conduit, or a port in the wall of some compartment with respect to which the flow conditions are to be observed. Alternatively, the inlet end of the flow tube may be directly positioned in the flow path, as against a grille at which the air or other flow, or absence thereof, is to be ascertained. The device is equally useful for examination of inflow to a chamber or the like subject to reduced or negative pressure conditions. In such case the meter is merely reversed endwise and the open end of the housing placed at or in the opening to the low-pressure region.

For general utility the device may have a flow-directing flared formation at either or both ends, that is, at the flow-tube mouth 12 and at the open end of the housing, facilitating the use of either end in the position proximate to the test compartment or region, accordingly as the pressure therein is positive or negative. Such formations, which may be constructed as threaded or other attachments, or as modifications of the flow tube and the housing, are illustrated on a smaller scale in Fig. 5, the flare member or bell mouth for the flow tube being indicated at 12a and for the housing at 5a.

My invention is not limited to the particular embodiment as herein illustrated or described, its scope being pointed out in the following claims.

I claim:

1. A portable metering device for flow of air and other fluents, comprising a transparent tubular housing having a carrying handle, said housing open at one end and having a closure cap at the other end, a flow tube mounted on and extending through the cap and lengthwise in the housing in parallel axial relation and laterally spaced from the housing wall, the tube terminating in the housing along an elongated bevel in a plane acutely oblique to the axis and defining a correspondingly elongate flow outlet and marginal seat about the latter, a plate-like vane shaped and proportioned for reception on the seat in closing relation to the outlet, transverse pivotal supporting means for the vane on the tube in or paralleling the plane of the bevel, and counterbalancing means for the vane between and out of contact with the tube and the housing.

2. A fluid flow meter comprising a flow tube, means to support the tube with the longitudinal axis horizontal, one tube end defining an inlet, the other end being acutely bevelled at an obliquity angle of not more than about 20° with the horizontal and presenting a proportionately elongated outlet, a planar vane movable about a horizontal pivot adjacent the beginning of the bevel and balanced to seat lightly in closing relation to the outlet, a flow scale on the support means at the end of the bevel and arranged for indicating coaction with the free extremity of the vane as a pointer, the support means embracing a major portion of the flow tube and having a window adjacent the scale and the vane extremity.

3. In a flow meter, a portable tubular housing having closed and open ends, a cylindrical flow tube of uniform inner diameter carried in the housing and having an inlet extending through the closed housing end, the longitudinal axis of the housing and the flow tube disposed in parallelism, the flow tube having an elongated flatly bevelled outlet toward the open housing end, a vane pivotally supported in the housing to move to and from an inclined seated position at the flow tube outlet, a scale at the flow tube outlet positioned and calibrated to indicate units of flow in accordance with positions of the vane relative to it, and said housing having a transparent portion rendering the vane and scale indications observable from without.

4. A portable flow meter comprising an elongated tubular housing composed of a rigid transparent plastics material, a closure cap for one end of the housing, a flow tube of rigid plastics composition projecting into the housing through the cap, a pivoted plate-like flap member at the end of the flow tube in the housing, and a scale fixed in the housing in cooperative relation to the flap member for flow indications by the latter as a pointer, the flap member and scale being observable through the housing.

5. A portable flow meter comprising a horizontal flow tube having inlet and outlet ends, a valve-like flap having a body conformant to the tube outlet and a supporting extension, means pivotally connecting the tube and the flap extension for movement of the flap about a horizontal pivot in a transverse plane perpendicular to the tube axis, a counterweight on the extension and overlying the tube, a unitary housing for the tube and flap, a flow indicating scale in the housing adjacent the free end of the flap and calibrated with reference to flow-determined positions of the latter under a level status of the tube axis, and the housing having a transparent portion for external observation of the flap with reference to the scale.

6. A portable flow meter comprising a horizontally operable flow tube having an inlet end and an opposite actutely bevelled end presenting an elongated outlet, a similarly elongated vane conformant to and adapted to close the outlet, a housing embracing the flow tube and supporting it with the inlet end externally accessible for a flow to be measured, said housing having an opening adjacent the flow tube outlet, horizontal pivotal means within the housing mounting the vane near the inner end of the flow tube outlet, vane counter-weighting means spanning the flow tube within the housing and lightly balancing the vane in outlet closing position under zero flow, a scale on the housing calibrated in flow units and cooperative pointer means moving with the vane and readable against said scale, the flow-tube inlet being operatively presentable toward fluid outflow openings and the housing opening being operatively presentable toward fluid inflow openings, and said tube inlet and said housing opening being constructed and arranged for demountable attachment thereat of tubular accessory and adapter means as appropriate for the type, size and flow direction of the opening at which the flow condition is to be measured.

LESLIE SILVERMAN.

REFERENCES CITED

The following references are of record in the file of this patent:

UNITED STATES PATENTS

| Number | Name | Date |
| --- | --- | --- |
| 335,213 | Brown | Feb. 2, 1886 |
| 735,912 | Schrotz | Aug. 11, 1903 |
| 999,950 | Berthelot et al. | Aug. 8, 1911 |
| 1,188,175 | Hodgson et al. | June 20, 1916 |
| 1,776,297 | Sanderson | Sept. 23, 1930 |
| 2,315,185 | Boyle | Mar. 30, 1943 |

FOREIGN PATENTS

| Number | Country | Date |
| --- | --- | --- |
| 253,248 | Germany | Nov. 5, 1912 |
| 396,506 | Great Britain | Aug. 10, 1933 |